United States Patent
Magnusson et al.

(10) Patent No.: US 6,475,623 B1
(45) Date of Patent: Nov. 5, 2002

(54) MULTI-LAYERED, CERAMIC-BASED HARDWOOD FINISH

(76) Inventors: Tryggvi Magnusson, 1010 Everest Blvd., Wausau, WI (US) 54403; Guenther Pollak, 4301 N. Lake Shore Dr., Wausau, WI (US) 54401

( * ) Notice: Subject to any disclaimer, the term of this patent is extended or adjusted under 35 U.S.C. 154(b) by 0 days.

(21) Appl. No.: 09/190,683

(22) Filed: Nov. 12, 1998

(51) Int. Cl.[7] .......................... B32B 27/38; B32B 27/00; B32B 21/09; B32B 9/00

(52) U.S. Cl. ...................... 428/414; 428/142; 428/148; 428/423.3; 428/425.9; 428/537.1; 428/702

(58) Field of Search ................................. 428/702, 414, 428/423.3, 425.9, 413, 142, 143, 148, 328, 329, 537.1, 507, 50, 514

(56) References Cited

U.S. PATENT DOCUMENTS

| | | | | |
|---|---|---|---|---|
| 4,042,559 A | * | 8/1977 | Abelson et al. ............... | 260/38 |
| 5,458,953 A | * | 10/1995 | Wang et al. ................. | 428/195 |
| 6,218,001 B1 | * | 4/2001 | Chen et al. .................. | 428/323 |

* cited by examiner

Primary Examiner—Blaine Copenheaver
Assistant Examiner—Kevin R Kruer
(74) Attorney, Agent, or Firm—Boyle Fredrickson Newholm Stein & Gratz S.C.

(57) ABSTRACT

A multi-layered protective finish for use on hardwood surfaces includes ceramic additives in selected layers. The finish is comprised of multiple sealant layers (preferably epoxy) and top coat layers (preferably polyurethane), some of which contain ceramic components, namely, aluminum oxide and zirconium oxide. The multi-layered, ceramic-based finish exhibits enhanced abrasion and stain resistance. The required concentrations of zirconium oxide provide enhanced hardness without sufficiently compromising flexibility which is important to maintain integrity of the finish.

7 Claims, 1 Drawing Sheet

MULTI-LAYERED, CERAMIC-BASED HARDWOOD FINISH

BACKGROUND OF THE INVENTION

Hardwoods are used in a variety of applications to provide aesthetically pleasing furniture and flooring. The hardwoods used in making furniture and flooring are susceptible to damage from ordinary usage and accidents. As such, it is conventional to protect hardwoods with some form of permanent coating or finish on their exposed surfaces.

Prior art protective finishes for hardwood furniture and flooring include varnishes, urethanes, epoxies, acrylics, and other suitable coatings that adhere to the surface of the hardwood. The protective finish is usually applied to the hardwood surface in layers, with each layer performing a specific purpose within the coating. For example, the protective finish normally constitutes sealers applied directly to the hardwood surface, and top coat layers applied over the sealing layers. Upon hardening, these multi-layer finishes not only reduce mechanical damage such as scratching, gouging or the like, but also provide stain resistance. Quite often, various layers contain additives to improve the overall effectiveness of the protective finish.

Protective finishes can create a slippery surface on the hardwood. Therefore, with hardwood flooring, it is known to apply a non-slip surface coating to create a high coefficient of friction on the surface. Preferably, the non-slip surface coating does not affect the overall durability or aesthetic qualities of the protective finish.

It is known to use aluminum oxide as an additive in certain layers of the protective finish in order to increase the abrasion resistance. These finishes typically have an abrasion resistance of between 5,000 and 11,000 revolutions when measured using the standardized CS-17 Taber testing procedure (ASTMINEMA Standards).

Many additives that improve abrasion resistance are likely to compromise other desirable characteristics such as clarity, slip resistance, stain resistance, etc. Therefore, it is difficult to develop practical protective finishes with enhanced abrasion resistance. Nonetheless, protective finishes having enhanced abrasion resistance are desirable, especially for use on hardwood flooring.

SUMMARY OF THE INVENTION

The invention is a ceramic-based finish for use on hardwood surfaces that has enhanced abrasion resistance. When applied to hardwood flooring, the multi-layered, ceramic-based finish is durable and reduces wear from ordinary usage and accidental damage. In addition, the ceramic-based finish dries clear on hardwood surfaces and allows the grain of the hardwood to show clearly. Also, the finish provides increased stain resistance to normal household substances.

The ceramic-based protective finish is preferably formed by applying multiple layers of sealers (preferably epoxyacrylic or polyurethane acrylic) and top coats (preferably polyurethane acrylic). to the hardwood surface. It should be understood that the term "epoxy" as used in this description and in the drawings refers to epoxyacrylic compounds, and the term "polyurethane" refers to polyurethane acrylic compounds. A water-based sealer is preferably applied before applying the multi-layer, ceramic-based protective finish. The sealant layers and top coat layers used in forming the protective finish preferably include the following components:

Epoxyacrylic-oligomers,
urethaneacrylic-oligomers,
hexamethylene diacrylate,
tripropylenglycoldiacrylate,
2-hydroxy-2-methyl-1-phenyl-propan- 1-on benzoyl-derivative,
ethylbenzene,
poly-di-isocyanates
aluminum oxide, and
zirconium oxide.

The above components are combined in water in different formulations to form the various sealant layers and top coat layers. When applied in succession over a hardwood surface and UV hardened, there is optimal bonding both between the base layer and the hardwood surface, and the subsequent layers.

If desired, the multi-layer, ceramic-based coating can be applied over natural or stained surfaces. The ceramic additives (namely, aluminum oxide and zirconium oxide) are included in selected layers. The ceramic additives substantially improve abrasion and stain resistance without compromising clarity or other desirable characteristics of the finish.

It is a primary object of the invention to provide a practical, ceramic-based protective finish that bonds effectively to hardwood surfaces, which also provide improved stain and abrasion resistance.

It is a further object of the invention to provide a ceramic-based protective finish that is easily manufactured and easily applied to hardwood surfaces.

It is a further object of the invention to provide a ceramic-based finish that provides the above advantages, yet is also inexpensive and easy to maintain.

DETAILED DESCRIPTION OF THE INVENTION

Figure 1:
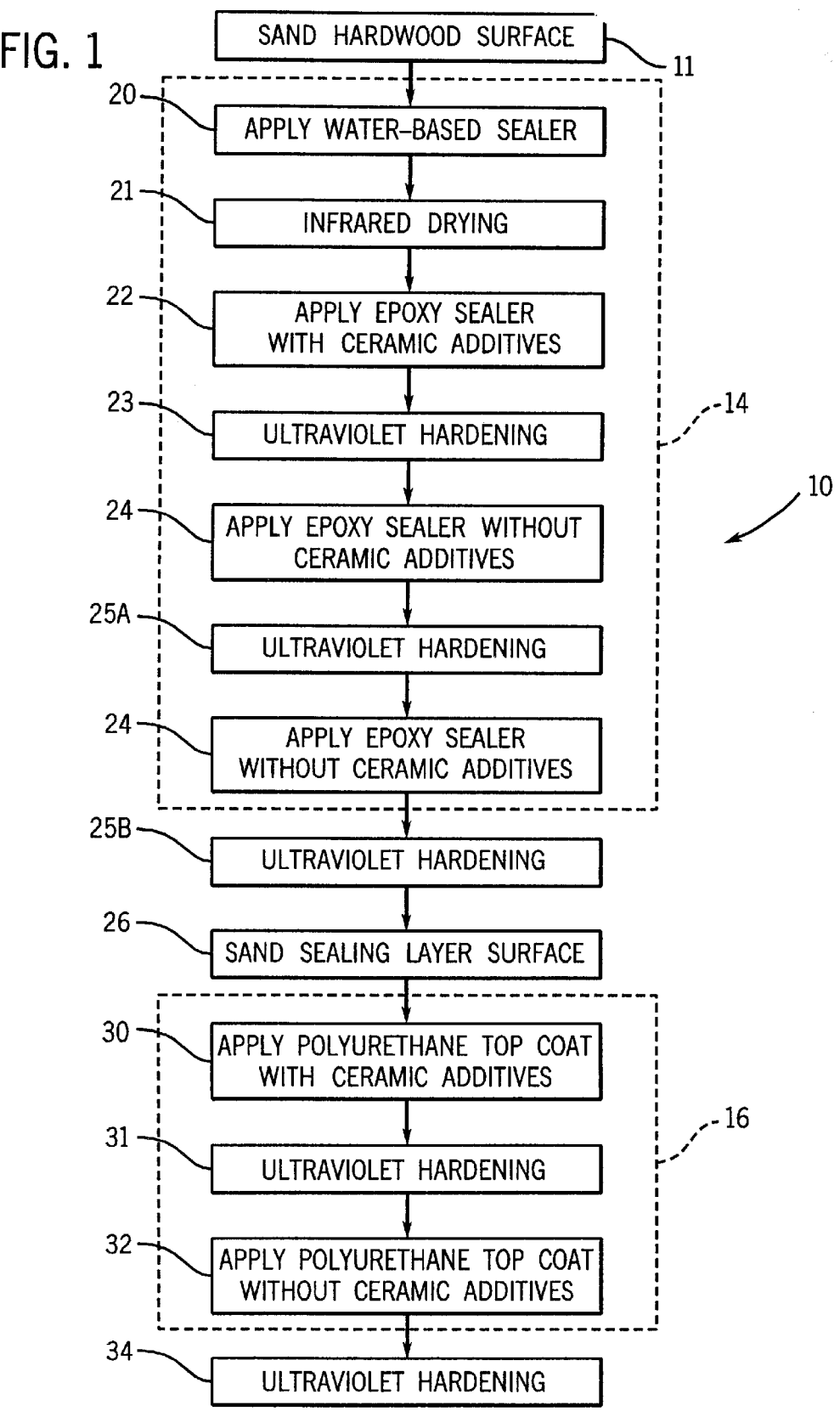
FIG. 1 is a flowchart illustrating the preferred process for applying a multi-layered, ceramic-based finish to a hardwood surface in accordance with the preferred embodiment of the invention.

As mentioned, the invention is an improved multi-layer, ceramic-based finish for hardwood surfaces. FIG. 1 illustrates the preferred process 10 for applying the finish to hardwood flooring. The process 10 involves successive application of sealant layers 14 and top coat layers 16 on the hardwood surface.

Referring to FIG. 1, the hardwood surface is initially sanded and cleaned, block 11 in FIG. 1, prior to applying the sealant layers 14. Sanding provides a relatively smooth surface for subsequent application of layers, and removes irregularities on the hardwood surface which can create breaks in the hardened finish. The sealant layers 14 preferably consist of a water-based sealant 20 applied directly to the hardwood surface, followed by a layer of ceramic-based epoxy sealer 22, and two layers of epoxy sealer 24 without the ceramic additives. If desirable, the hardwood surface can be stained after applying water-based sealant layer 20.

The water-based sealant layer 20 applied on the hardwood surface is preferably a solution of 2-butoxyethonal in water. The 2-butoxyethonal concentration is in the range of 2.5–10% by weight of the solution. The water-based sealant 20 penetrates into the pores in the hardwood surface and bonds the surface. The water-based sealant layer 20 (and the stain if a stain is applied) is dried using an infra-red dryer, see block 21 in FIG. 1. The water-based sealant 20 protects the surface, and also provides a suitable base for subsequent epoxy sealant layers 22, 24.

The epoxy sealant layers 22, 24 are generally a mixture of:

| | |
|---|---|
| Acrylic-oligomers | 40–70% by weight |
| Acrylic-monomers | 25–40% by weight |
| Photoinitiators | 3–6% by weight |
| Additives | 4–8% by weight |
| Poly-di-isocyanates | 2–5% by weight |

The preferred mixture for the epoxy sealant layers 22, 24 is sold under the trade name DEDEPOL-UV-SEALER™ sold by Landshuter Lackfabrik.

The ceramic-based, epoxy sealant layer 22, which is applied directly on the water-based sealer 20 (or stain), contains the ceramic additives of aluminum oxide and zirconium oxide. It is important that the concentration of the ceramic additives be kept below 30% by weight, otherwise the normally clear epoxy sealer 22 may become cloudy. In accordance with the invention, the ceramic additives preferably comprise aluminum oxide in the range of 30% to under 10% and zirconium oxide in the range of 70% to over 90%. To date, the most preferred formulation is 10% aluminum oxide and 90% zirconium oxide. It has been found that this formulation provides enhanced hardness while also providing sufficient flexibility to avoid cracking. Block 23 on FIG. 1 illustrates that it is preferred to UV harden the ceramic-based epoxy layer 22 after it is applied. In the ultraviolet (UV) hardening process, the coated hardwood is passed under a number of ultraviolet lights, and the ceramic-based epoxy sealer layer 22 bonds with the water-based sealer 20 to form a hard barrier over the water-based sealer 20. The aluminum oxide and zirconium oxide added to the epoxy sealant layer 22 provide greater abrasion resistance for the protective finish on the hardwood surface once the finish is fully hardened.

Two epoxy sealant layers 24 without ceramic additives are preferably applied in succession on the ceramic-based epoxy sealant layer 22. The non-ceramic epoxy sealant layers 24 serve to provide additional protection to the hardened surface, and aid in setting the appropriate gloss level. Blocks 25A and 25B in FIG. 1 illustrate that UV hardening is preferred after the application of each non-ceramic-based epoxy sealant layer 24. The UV hardening not only hardens the sealant layers 14, but also rigidly adheres the various sealant layers 14 to the hardwood surface.

After the sealant layers 14 are UV hardened, the finish is then lightly sanded using aluminum oxide sandpaper, block 26, to prepare for the application of the top coat layers 16. As shown in FIG. 1, there are preferably two polyurethane top coat layers 30, 32. The first top coat layer 30 is applied directly on the sanded and cleaned surface of the top epoxy layer 24. Preferably, the first top coat layer 30 is a polyurethane having the ceramic additives, namely zirconium oxide (in the range of 10%–50%—preferably 25%) and aluminum oxide (in the range of 90%–50%—preferably 75%). The second top coat layer 32, which is applied over the first top coat layer 30, is preferably polyurethane without the ceramic additives.

The polyurethane top coat layers 30, 32 are generally a mixture of:

| | |
|---|---|
| Acrylic-oligomers | 40–60% by weight |
| Acrylic-monomers | 25–45% by weight |
| Wax and Matting agents | 2–5% by weight |
| Photoinitiators | 3–6% by weight |
| Wetting, defoaming and flow additives | 5–12% by weight |

The preferred mixture for the polyurethane top coat layer is sold under the trade name DEDEPOL-UV-TOP COAT by Landshuter Lackfabrik.

As mentioned, the ceramic-based, polyurethane top coat layer 30 contains the ceramic additives of aluminum oxide (preferably 75%) and zirconium oxide (preferably 25%). Again, it is desired that the concentration of ceramic additives be kept below 30% by weight of the top coat layer 30. Concentrations of ceramic additives above 30% by weight may cause the ceramic-based top coat 30 to become cloudy, thereby reducing clarity and gloss of the protective coating. Using the ceramic additives (namely, aluminum oxide and zirconium oxide) significantly enhances abrasion and stain resistance for the protective finish 10. Block 31 in FIG. 1 illustrates that the finish is UV hardened after the ceramic top coat layer 30 is applied.

After the ceramic-based polyurethane 30 is hardened, the second layer of polyurethane (without ceramic additives) 32 is applied to form a non-slip surface on the hardwood. The application of second polyurethane layer 32 also controls, in conjunction with the epoxy sealant layers 24, the gloss level for the hardwood surface. Block 34 in FIG. 1 illustrates that the finish is again UV hardened after the second polyurethane top coat layer 32 is applied. The surface of top coat polyurethane layer 32 when hardened includes microscopic beads that provide a relatively high coefficient of friction, and a non-slip surface.

The abrasion resistance of the multi-layered, ceramic-based finish has been tested on hardwood flooring using industry standard Taber testing techniques at least two different testing facilities. Samples of a hardwood floor section coated with the multi-layer, ceramic-based finish were tested for abrasion resistance under a number of different conditions. Typically, the wear resistance or abrasion resistance is defined as an average of the number of cycles necessary for an abrasion wheel to initially wear-through the protective finish and the number of cycles to completely wear through the finish. The abrasion surface and load on the abrasion wheel are adjusted depending on industry standards for the particular test. The testing procedure at the facility identified in Table 1 involved two Taber abrasion wheels each having a preselected abrasion surface and a 500 g load. Three (3) separate tests were conducted at the facility identified in Table 1, wherein each test involved the testing of two samples under ASTM/NEMA testing standards for various Taber Abrasion Surfaces (CS-17, S-42, S-43). The results for abrasion resistance of the multi-layered, ceramic-based finish are itemized in Table 1:

TABLE 1

Abrasion Testing at ATS (7-23-98)

| Wheel Grit | Award Hardwood Flooring with Coating | No. of Cycles/ Revolutions to Initial Wear-Through | No. of Cycles/ Revolutions to Total Wear-Through | Abrasion Resistance |
|---|---|---|---|---|
| Taber CS-17 | Sample 1 | 20,000 | 24,500 | 22,250 |
| Taber CS-17 | Sample 2 | 16,000 | 24,500 | 20,250 |
| Taber S-42 | Sample 1 | 1,600 | 1,800 | 1,700 |
| Taber S-42 | Sample 2 | 1,700 | 2,000 | 1,850 |
| Taber S-33 | Sample 1 | 4,300 | 4,800 | 4,550 |
| Taber S-33 | Sample 2 | 4,050 | 4,600 | 4,325 |

The test results in Table 1 corroborate that a multi-layered, ceramic-based coating in accordance with the invention has enhanced abrasion resistance. A similar test was conducted by a second testing facility utilizing a CS-17 abrasion surface and a 500 g load per wheel. The test results in Table 2 also illustrate that a multi-layered, ceramic-based finish in accordance with the invention has enhanced abrasion resistance.

TABLE 2

Abrasion Testing at Landshuter Lackfabrik (5-12-98)

| Wheel Grit | Award Hardwood Flooring with Coating | No. of Cycles/ Revolutions to Initial Wear-Through | No. of Cycles/ Revolutions to Total Wear-Through | Abrasion Resistance |
|---|---|---|---|---|
| Taber | Sample 1 | 15,800 | 19,300 | 17,550 |

In addition to superior abrasion resistance, a multi-layered, ceramic-based finish in accordance with the invention has enhanced stain resistance. For example, after exposure for 18 hours, the following materials did not significantly affect hardwood flooring with the multi-layered, ceramic-based finish: acetone, alcohol, bleach, coffee, fingernail polish, lipstick, milk, soda, juice, jelly, wine, catsup, vinegar, beer, butter, and black shoe polish.

It should be appreciated that the invention has been disclosed in connection with its preferred embodiment. Various alternatives, modifications and equivalents may be apparent to those skilled in the art and should be considered to fall within the scope of the following claims. Furthermore, depending on the application, it might not be necessary or even desirable to include each and every layer disclosed in FIG. 1. Likewise, in some cases it may be desirable to provide additional layers or provide additional conditioning of the various layers when carrying out the invention.

We claim:

1. A protective finish having multiple layers usable on hardwood flooring surfaces comprising:
   an initial sealer layer capable of being applied directly on a hardwood flooring surface;
   an epoxy sealer layer containing ceramic additives applied over the initial sealer layer;
   two or more additional epoxy sealer layers without ceramic additives applied over the epoxy sealer layer containing ceramic additives;
   a polyurethane top coat layer containing ceramic additives applied over the two or more additional epoxy sealer layers; and
   an additional polyurethane top coat layer without ceramic additives applied over the polyuremane top coat layer containing cerumic additives;

wherein the ceramic additive containing and additional epoxy sealer layers comprise by weight percent of the total weight of the resin:
   a. 40–70% epoxy acrylic-oligomers,
   b. 25–40% epoxy acrylic-monomers,
   c. 3–6% photoinitiators
   d. 4–8% additives, and
   e. 2–5% poly-di-isocyanate; and wherein the ceramic additive containing and additional polyurethane top coat layers comprise by weight percent of the total weight of the resin:
   a. 40–60% urethane acrylic-oligomers;
   b. 25–45% urethane acrylic-monomers;
   c. 2–5% wax and matting agents;
   d. 3–6% photoinitiators; and
   e. 5–12% wetting defoaming and flow additives.

2. The ceramic-based protective finish of claim 1 wherein the sealer layer containing ceramic additives and the top coat layer containing ceramic additives contain aluminum oxide and zirconium oxide as ceramic additives.

3. The protective finish of claim 1 wherein the epoxy sealer layer containing ceramic additives contains no more than 30% ceramic additives by weight.

4. The protective finish recited in claim 3 wherein the ceramic additives in the epoxy sealer layer containing ceramic additives consist essentially of aluminum oxide in the range of 30% to approximately 10% by weight of ceramic additive and zirconium oxide in the range of 70% to approximately 90% by weight of ceramic additive.

5. The protective finish of claim 1 wherein the polyurethane top coat layer containing ceramic additives contains no more than 30% by weight of the ceramic additive.

6. The protective finish of claim 5 wherein the ceramic additives in the polyurethane top coat layer containing ceramic additives consist essentially of aluminum oxide in the range of 50% to 90% by weight of ceramic additive and zirconium oxide in the range of 10% to 50% by weight of ceramic additive.

7. A protective finish having multiple layers usable on hardwood flooring surfaces comprising:
   an initial sealer layer capable of being applied on a hardwood flooring surface;
   an epoxy sealing layer containing ceramic additive in an amount no greater than 30% by weight of the epoxy sealing layer, said ceramic additives in the epoxy sealing layer consisting essentially of aluminum oxide in the range of 30% to approximately 10% by weight of ceramic additive in the epoxy sealing layer and zirconium oxide in the range of 70% to approximately 90% by weight of ceramic additive in the epoxy sealing layer; and
   a polyurethane top coat layer containing ceramic additives in an amount no greater than 30% by weight of the polyurethane top coat layer, the ceramic additives in the polyurethane top coat layer consisting essentially of aluminum oxide in the range of 90% to 50% by weight of ceramic additive in the polyurethane top coat layer and zirconium oxide in the range of 10% to 50% by weight of ceramic additive in the polyurethane top coat layer wherein resin for the epoxy sealing layer comprises by weight percent of the total weight of the resin:
   a. 40–70% epoxy acrylic-oligomers,
   b. 25–40% epoxy acrylic-monomers,
   c. 3–6% photoinitiators
   d. 4–8% additives, and e. 2–5% poly-di-isocyanate; and and resin for the polyurethane top coat layer comprises by weight percent of the total weight of the resin:
  a. 40–60% urethane acrylic-oligomers;
  b. 25–45% urethane acrylic-monomers;
  c. 2–5% wax and matting agents;
  d. 3–6% photoinitiators; and
  e. 5–12% wetting, defoaming and flow additives.

* * * * *